UNITED STATES PATENT OFFICE.

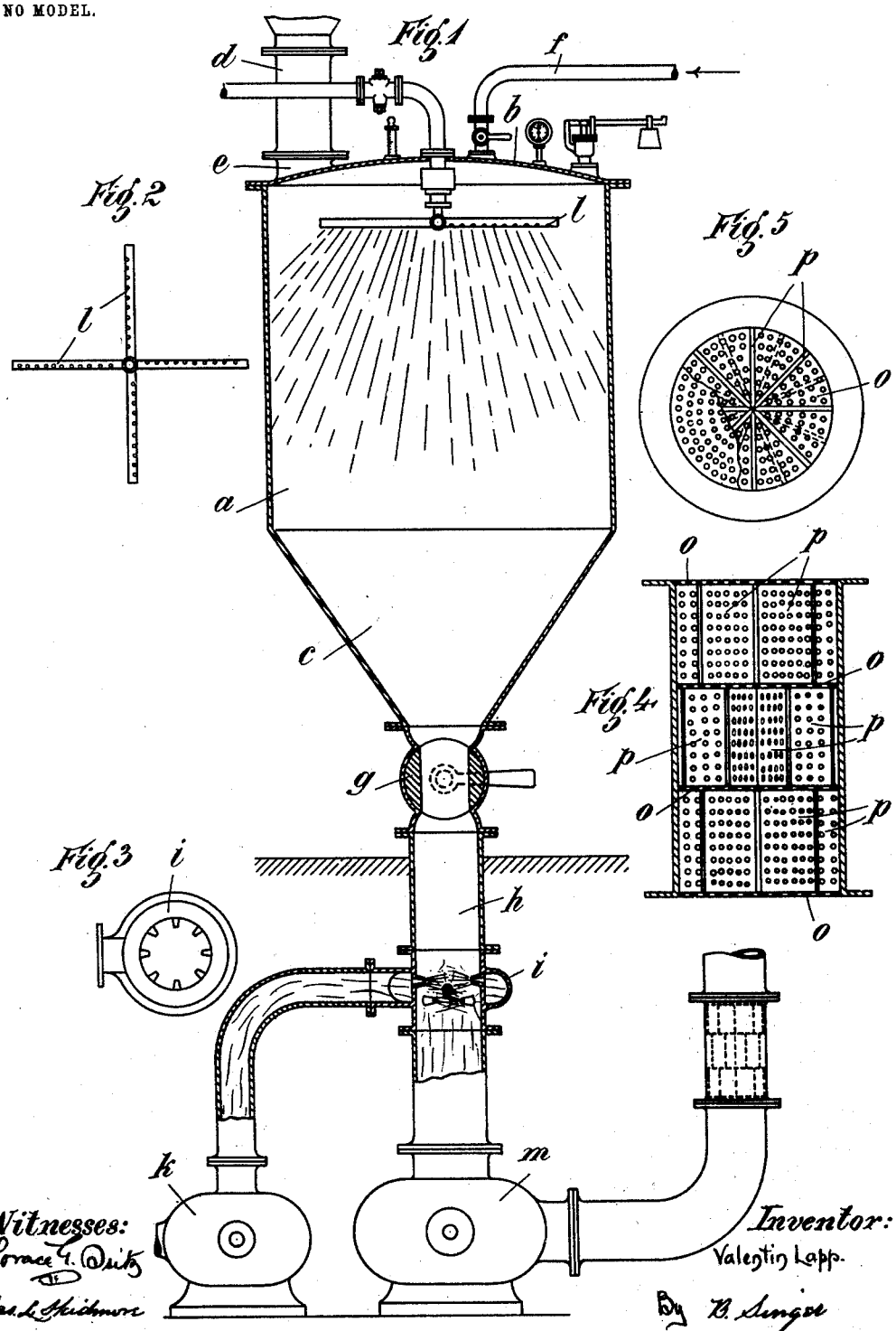

VALENTIN LAPP, OF LINDENAU, NEAR LEIPSIC, GERMANY.

METHOD OF PREPARING MALT FOR MASHING.

SPECIFICATION forming part of Letters Patent No. 719,479, dated February 3, 1903.

Application filed May 15, 1901. Serial No. 60,356. (No specimens.)

*To all whom it may concern:*

Be it known that I, VALENTIN LAPP, brewer, a subject of the King of Saxony, residing at Lindenau, near Leipsic, in the Kingdom of Saxony, in the German Empire, have invented certain new and useful Improvements in Methods of Preparing Bruised or Ground Malt for Mashing, of which the following is a specification.

This invention relates to a method of preparing bruised or ground malt for mashing; and it consists, essentially, in forcing the bruised or ground malt from a container in which it is kept under the pressure of air, carbonic acid, steam, or the like through a pipe into which finely-distributed water is injected under pressure for a certain length of way. The malt is made to pass through the jets, which cross each other in all directions, or through the thus-formed kind of spray, respectively, and is thereby mixed in a very thorough manner. The mixture of malt and water thus obtained is led to a high-speed pump producing a high pressure and is forced by means of this pump through one or more sieves, so that there results a mash of milky appearance in which there are no clods or lumps and in which all the particles are dissolved. This mash is then led into the mash-tun or the like. The force of the pump should amount to about five atmospheres.

In order to clearly describe my invention, I refer to the accompanying drawings, in which—

Figure 1 is a vertical sectional view through the apparatus. Fig. 2 is a bottom plan view of the rotating spraying device or reaction-pipes. Fig. 3 is a view showing the section carrying the spraying-nozzles. Fig. 4 is a vertical sectional view of the sieve portion; and Fig. 5 is a plan view, with parts broken away, of the parts shown in Fig. 4.

In the drawings, $a$ designates a closed vessel intended to receive the mixture of malt and water. Said vessel has a vaulted cover or lid $b$ and is contracted at its lower part, so as to form a funnel $c$. The malt may be led to and into the vessel $a$ directly from a crushing-mill (not shown) by connecting the outlet $d$ of the latter with the inlet $e$ of the said vessel. When the latter is filled, the connection between $d$ and $e$ is broken by any suitable means, and the compressed air or the like is allowed to pass into the vessel $a$ by opening the cock or valve which controls the pipe $f$ and which connects with a source of air under pressure and which is normally closed. At the same time the closing device $g$ at the lower end of the funnel $c$ is opened and the malt is now forced, by means of the pressure exerted by the compressed air, into the outlet-pipe $h$ of said funnel. Within this pipe is located a series of inlets $i$, extending radially of the pipe, by the aid of which water is forced into the malt by means of a pump $k$ or by any other suitable device, and the water thus finely distributed comes into intimate contact with the malt. After the main quantity of the malt has been forced out of the vessel $a$ and through the pipe $h$ a blowing device $l$, preferably formed by a laterally-perforated rotary reaction-pipe, is put in operation. This reaction-pipe is a two-armed (or, if desired, four or six armed) pipe, the arms of which extend radially from the central holder. The whole is, in fact, nothing else but a form of execution of the so-called "Barker's mill," (see *Webster's Complete Dictionary of the English Language*, 1886, page 109,) which is an old and known contrivance based on the recoil of laterally-issuing jets of water. In the present case air is employed instead of water, and this being the whole difference it is thought useless to show other views and positions of said pipe $l$ than that represented in the figure. The currents of air streaming forth from said pipe $l$ circulate within the vessel $a$, and in passing along the wall of the latter they remove from said wall the remainder of the bruised or ground malt and cause it to pass down into the pipe $h$ and through the spray $i$. The mash produced in the aforedescribed manner is conducted to a high-speed pump $m$ and forced by this pump through an arrangement of sieves—for instance, such as is shown in the drawings—which consists of four horizontal sieves $o$ and some vertical sieves $p$, located between said horizontal ones and arranged, preferably, in a radial manner. The mash in being forced through the thus-arranged sieves $o$ and $p$ is caused to move in different directions, and owing to the pressure exerted by the pump m upon the mash the clods or lumps which may be therein contained are completely reduced or subdivided and dissolved, so that the mash when reaching the tub is perfectly free of undissolved particles or the like.

It will be seen that the malt is held under the action of both the compressed air and the pump m during its passage through the pipe h, and consequently the high pressure of the water through the nozzles or inlets i will not affect the continued passage of the malt through the pipe, while the formation of these high-pressure inlets of water in the relatively small diameter pipe insures a thorough mixing of the ground malt and the water.

It will be understood that there is no tendency of a saccharification of the diastase during the entire process, as the malt-meal is not subjected to the action of heat.

Having now described my invention, what I desire to secure by a patent of the United States is—

The method of preparing pulverulent malt for mashing consisting in passing the ground malt through a relatively small diameter pipe under the pressure of a compressed agent and the action of a pump; subjecting it, while in said pipe or channel, prior to reaching the pump, to the action of water under high pressure and introduced in jets passing radially into the pipe; and then forcing the malt, under pressure, from the pump through a series of sieves to the mash-tub, substantially as and for the purposes described.

In witness whereof I have hereunto set my hand in presence of two witnesses.

VALENTIN LAPP.

Witnesses:
OTTO NAUMANN,
RUDOLPH FRICKE.